United States Patent
Li

(10) Patent No.: US 12,459,586 B2
(45) Date of Patent: Nov. 4, 2025

(54) QUADRUPED ROBOTIC DOG WITH CENTER OF GRAVITY ADJUSTMENT MECHANISM

(71) Applicant: PETOI (SHENZHEN) TECHNOLOGY CO., LTD, Shenzhen (CN)

(72) Inventor: Rongzhong Li, Shenzhen (CN)

(73) Assignee: PETOI (SHENZHEN) TECHNOLOGY CO., LTD, Shenzhen (CN)

( * ) Notice: Subject to any disclaimer, the term of this patent is extended or adjusted under 35 U.S.C. 154(b) by 535 days.

(21) Appl. No.: 18/055,418

(22) Filed: Nov. 15, 2022

(65) Prior Publication Data

US 2023/0072465 A1    Mar. 9, 2023

Related U.S. Application Data

(63) Continuation of application No. PCT/CN2021/079431, filed on Mar. 6, 2021.

(30) Foreign Application Priority Data

Jul. 21, 2020 (CN) .......................... 202010705191.7

(51) Int. Cl.
    *B62D 57/032* (2006.01)
(52) U.S. Cl.
    CPC .................. *B62D 57/032* (2013.01)
(58) Field of Classification Search
    CPC .................................................... B62D 57/032
    See application file for complete search history.

(56) References Cited

FOREIGN PATENT DOCUMENTS

| CN | 103192898 | A |   | 7/2013  |            |
|----|-----------|---|---|---------|------------|
| CN | 107284547 | A | * | 10/2017 | ... H01M 50/20 |
| CN | 207311652 | U | * | 5/2018  |            |
| CN | 108818515 | A |   | 11/2018 |            |
| CN | 109204602 | A |   | 1/2019  |            |
| CN | 209080040 | U |   | 7/2019  |            |
| CN | 110126939 | A |   | 8/2019  |            |
| CN | 111846004 | A |   | 10/2020 |            |
| CN | 212354207 | U |   | 1/2021  |            |
| CN | 108944302 | B | * | 10/2021 | ... B60F 5/02 |
| CN | 116985926 | A | * | 11/2023 | ... H02G 1/02 |

(Continued)

OTHER PUBLICATIONS

International Search Report issued in corresponding International application No. PCT/CN2021/079431, mailed Jun. 1, 2021.

(Continued)

*Primary Examiner* — Drew J Brown

(57) ABSTRACT

A quadruped robotic dog equipped with a center of gravity adjustment mechanism is disclosed and includes a base, a shoulder assembly connected to the base, a head assembly connected to a top of the shoulder assembly, and a leg assembly connected to sides of the shoulder assembly. The base includes a chassis and a battery box. The chassis includes an elastic slide rail, which defines two cap holes. The battery box includes a slide bar, both ends of which each include a round cap. The round caps of the battery box are operative to be snapped-fitted with the cap holes, and the slide bar of the battery box is operative to slide within the elastic slide rail.

10 Claims, 14 Drawing Sheets

(56) References Cited

FOREIGN PATENT DOCUMENTS

| CN | 117104364 A | * | 11/2023 | ............ | B62D 57/032 |
|---|---|---|---|---|---|
| CN | 118289113 A | * | 7/2024 | ............ | B62D 57/032 |
| CN | 118343334 A | * | 7/2024 | ............ | B62D 57/032 |
| JP | 2003225875 A | | 8/2003 | | |
| KR | 20140021752 A | | 2/2014 | | |
| KR | 101477068 B1 | | 12/2014 | | |
| WO | 2019136356 A1 | | 7/2019 | | |

OTHER PUBLICATIONS

Written Opinion of the International Search Authority in corresponding International application No. PCT/CN2021/079431.

* cited by examiner

QUADRUPED ROBOTIC DOG WITH CENTER OF GRAVITY ADJUSTMENT MECHANISM

CROSS-REFERENCE TO RELATED APPLICATIONS

This application is a continuation of co-pending International Patent Application Number PCT/CN2021/079431, filed on Mar. 6, 2021, the disclosure of which is incorporated herein by reference in its entirety.

TECHNICAL FIELD

This disclosure relates to the technical field of legged sports machinery, and more particularly relates to a quadruped robotic dog equipped with a center of gravity adjustment mechanism.

BACKGROUND

Legged sports machinery is able to use discontinuous ground contact points to provide support and propulsion. Compared with wheeled machinery or crawler-type machinery, it has better terrain adaptability, and has a unique sense of animation and ornamental.

The quadruped robot is suitable for complex terrain cruising, scientific research and teaching, performance and entertainment, or used as bionic pets. However, due to the complexity of the hardware structure and control algorithm of their multi-degree-of-freedom joints, quadruped robots are often very cumbersome and expensive. Furthermore, for quadruped robots, subsequent improvement is inconvenient, the center of gravity is not adjustable, and it is easy to tip over.

SUMMARY

In view of the above, a main technical problem to be solved by the present disclosure is to provide a quadruped robotic dog equipped with a center of gravity adjustment mechanism, which can adjust the center of gravity by sliding a slide bar in the battery box on an elastic slide rail in the chassis so that the user can easily adjust the center of gravity when using it, making it not easy to fall over.

In order to solve the above-mentioned technical problems, a technical solution adopted by the present disclosure is to provide a quadruped robotic dog equipped with a center of gravity adjustment mechanism, which includes a base, a head assembly, a shoulder assembly and a leg assembly. The shoulder assembly is connected to the base. The head assembly is connected to the top of the shoulder assembly. The leg assembly is connected to the sides of the shoulder assembly. The base includes a chassis and a battery box. Elastic slide rails are arranged on the chassis. The elastic slide rails define two cap holes. The battery box including a slide bar, and both ends of the slide bar each include a round cap. The round caps of the battery box can be snapped into the cap holes allowing the battery box to slide within the elastic slide rails through the slide bar.

As an improvement of the present disclosure, the shoulder assembly includes two shoulder plates and two side shoulders, where the two shoulder plates are respectively disposed at the front and rear ends of the base, and the two side shoulders are respectively disposed at the both sides of the base. Both sides of the chassis are each provided with a first latch, and both sides of the shoulder plate are each provided with a second latch. The side shoulders are each provided with a slot for inserting the first latch and a socket for inserting the second latch.

As a further improvement of the present disclosure, the chassis is provided with mounting posts for fixing a circuit board. The base further includes an upper cover, which is connected to the shoulder assembly through the raised snap rings on the two side shoulders and cover the circuit board.

As a further improvement of the present disclosure, the head assembly includes a head and a neck that are connected to each other, the bottom of the neck is provided with three short tenons, and the front end of the chassis is provided with three sockets for the insertion of the short tenons.

As a further improvement of the present disclosure, the bottom of the neck is further provided with a snap protrusion, and the front end of the chassis is also provided with an inner hole for the snap protrusion to be inserted.

As a further improvement of the present disclosure, the rear end of the neck is provided with a long tenon, and the shoulder plate at the front end of the chassis is provided with a long groove, and the long tenon can be snapped into the long groove. The top of the neck is connected with the head through a rocker arm of a head servomotor.

As a further improvement of the present disclosure, the leg assembly includes an upper leg and lower leg that are pivotally connected. The upper leg includes two leg half pieces, and the two leg half pieces are inserted in opposite directions with each other to form the upper leg. The front end of the leg half-piece is provided with a front insert piece, the inner side of the leg half-piece is provided with a first convex insert column, the rear end of the leg half-piece is provided with an hollow slot, and the middle of the leg half-piece is provided with a front slot for inserting the front insert piece and further with a second convex insert column corresponding to the first convex insert column. The first convex insert column and the second convex insert column form a cylinder, and the spring is sleeved on the cylinder.

As a further improvement of the present disclosure, the hollow slot at the front end of the upper leg is connected with the shoulder plate through the rocker arm of the shoulder servomotor. The hollow slot at the rear end of the upper leg is connected with the lower leg through the rocker arm of the knee servomotor.

As a further improvement of the present disclosure, the end of the lower leg is provided with anti-slip teeth.

As a further improvement of the present disclosure, the head includes an upper piece and a lower piece. The upper piece is hinged with the lower piece through a head rotary shaft, the front end of the upper piece is provided with canine teeth, and the front end of the lower piece is provided with a dog tongue. The rear edge of the upper piece is in contact with the lower piece, and when the upper piece rotates around a rotational axis of the head, the contact point will move along a circle.

The beneficial effects of the present disclosure are as follows. Compared with the related art, the present disclosure adjusts the center of gravity by sliding the slide bar in the battery box on the elastic slide rails in the chassis, so that the user can easily adjust the center of gravity to prevent it from falling over; the leg joints have an elastic buffer mechanism to protect the servomotor; the operation is convenient, and they are connected by tenon and mortise or by a snap protrusion, which is convenient for production, assembly and maintenance.

BRIEF DESCRIPTION OF DRAWINGS

For a better understanding of the technical solutions of the embodiments according to the present application, hereinafter the drawings that need to be used in the embodiments disclosed herein will be briefly described. It will be appreciated that the following drawings merely show some embodiments of the present application, and therefore should not be regarded as limiting the scope. For those having ordinary skill in the art, other related drawings may also be obtained based on these drawings without investing creative efforts.

Figure 1:
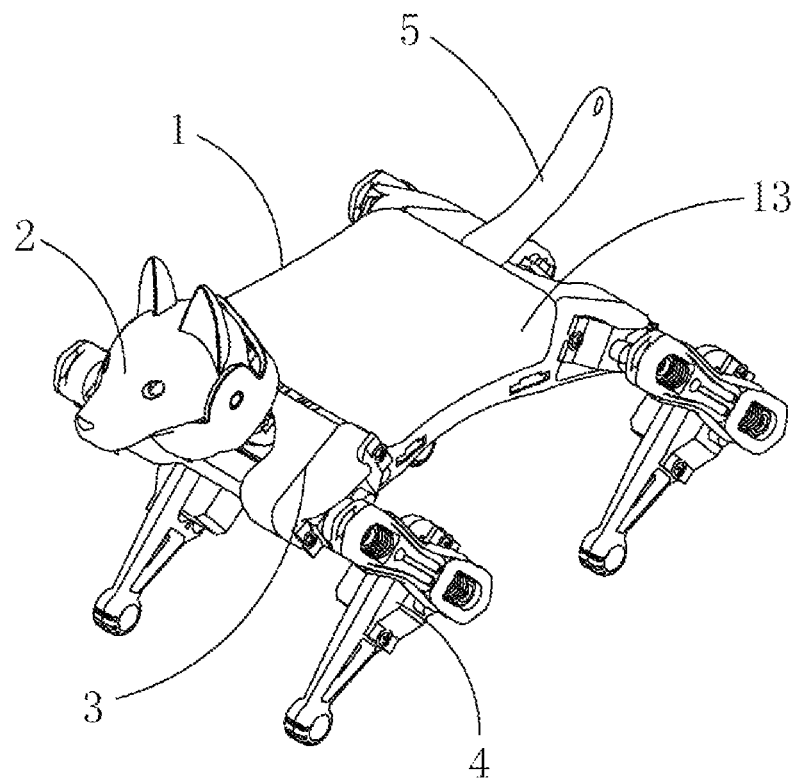
FIG. 1 is a schematic diagram of the present disclosure.

Reference numerals: 1—base, 11—chassis, 111—elastic slide rail, 112—cap hole, 113—first latch, 114—mortise, 115—inner hole, 12—battery box, 121—slide bar, 122—round cap, 13—upper cover, 14—mounting post, 2—head assembly, 21—head, 211—upper piece, 212—lower piece, 213—head rotary shaft, 214—canine tooth, 215—dog tongue, 22—neck, 221—short tenon, 222—snap protrusion, 223—long tenon, 3—shoulder assembly, 31—shoulder plate, 311—second latch, 312—elongated groove, 32—side shoulder, 321—slot, 322—socket, 4—leg assembly, 41—upper leg, 411—leg half piece, 412—front insert piece, 413—first convex insertion column, 414—hollow slot, 415—front insert slot, 416—second convex insertion column, 417—spring, 42—lower leg, 421—anti-skid teeth, 5—tail, 6—head servomotor, 61—rocker arm of head servomotor, 7—shoulder servomotor, 71—rocker arm of shoulder servomotor, 8—knee servomotor, 9—upper leg joint shaft, 91—lower leg joint shaft, 92—toe hole, 93—oblique edge of upper leg, 94—oblique edge of side shoulder, 95—first mounting screw of knee servomotor, 96—second mounting screw of knee servomotor, 97—third mounting screw of knee servomotor, 98—round rod, 10—ruler, 101—first round hole, 102—elongated hole, 103—second round hole, 104—triangular hole, 105—elongated slot.

DETAILED DESCRIPTION

For a better understanding of the objectives, technical solutions, and advantages of the present disclosure, hereinafter the present disclosure will be described in further detail in connection with the accompanying drawings and some illustrative embodiments. It is to be understood that the specific embodiments described here are intended for the mere purposes of illustrating this disclosure, instead of limiting.

The specific implementation of the present disclosure is described in detail below in connection with specific embodiments. As shown in FIG. 1 to FIG. 31, the present disclosure provides a quadruped robotic dog equipped with a center of gravity adjustment mechanism, including a base 1, a head assembly 2, a shoulder assembly 3, and a leg assembly 4. The shoulder assembly 3 is connected to the base 1, the head assembly 2 is connected to the top of the shoulder assembly 3, and the leg assembly 4 is connected to the sides of the shoulder assembly 3.

As shown in FIGS. 1 to 5, the base 1 includes a chassis 11 and a battery box 12. The chassis 11 is provided with an elastic slide rail 111, and the elastic slide rail 111 is provided with two cap holes 112. The battery box 12 is provided with a slide bar 121, and both ends of the slide bar 121 are each provided with a round cap 122. The battery box 12 can be snapped into the cap hole 112 through the round cap 122 and can slide in the elastic slide rail 111 through the slide bar 121. Further, the base 1 also includes an upper cover 13. The chassis 11 is provided with mounting posts 14 for fixing the circuit board. The base 1 also includes an upper cover 13, and the upper cover 13 can be connected to the shoulder plates 31 through the raised snap rings on the two side shoulders 32 and cover the circuit board. In the present disclosure, the tail 5 is connected to the rear end of the upper cover 13. In particular, the weight of the battery box 12 accounts for one third of the robot's own weight, so the center of gravity of the robot can be adjusted by changing the position of the battery box 12. On the other hand, if the user adds other components to the robot, the center of gravity of the robot will be offset, which will affect the balance of a preset action, and the change of the center of gravity can be compensated by changing the position of the battery box 12. The adjustment mechanism consists of the elastic slide rail 111 on the chassis 11 and the slide bar 121 on the top of the battery box 12. The slide bar 121 is provided with two round caps 122, and the elastic slide rail 111 has a row of cap holes 112 slightly larger than the diameter of the column of the round cap 122. The number and spacing of the cap holes 112 are determined by the size of the robot and the precision requirements of the center of gravity adjustment. The round cap 122 can just be stuck in the cap hole 112, the elasticity of the elastic slide rail 111 can be used for stretching so that the battery box 12 can slide back and forth in the elastic slide rail 111. The diameter of the round cap 122 is slightly larger than that of the cap hole 112, and the battery box 12 can be hung on the elastic slide rail 111. The diameter of the cap hole 112 at the end of the elastic slide rail 111 is slightly larger than that of the round cap 122, and the battery box 12 enters the elastic slide rail 111 from this. When presetting a robot action, the position of the battery box 12 in the elastic slide rail 111 is fixed and the balance parameters are adjusted. During use, if the user adds a weight to the front or rear side of the robot body, the battery box 12 can be slid in the opposite direction to offset the change of the position of the center of gravity.

Figure 2:
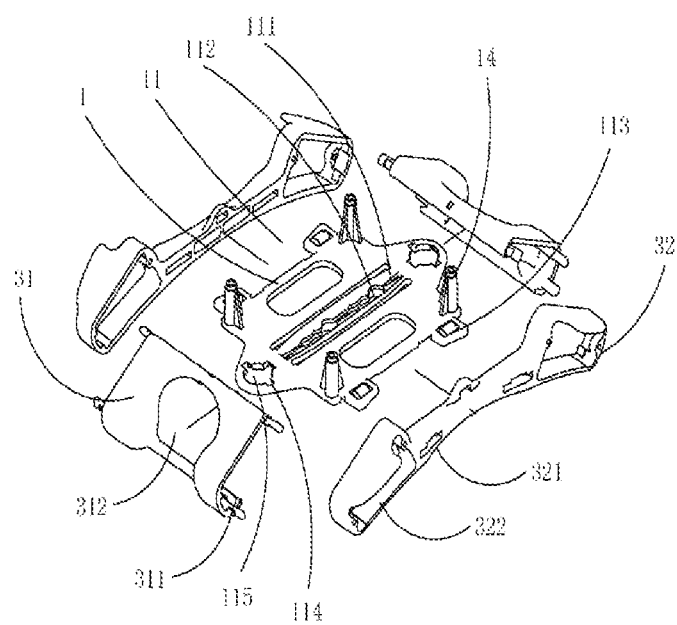
FIG. 2 is the exploded schematic diagram illustrating the connection of the chassis and the shoulder assembly according to the present disclosure.
Figure 3:
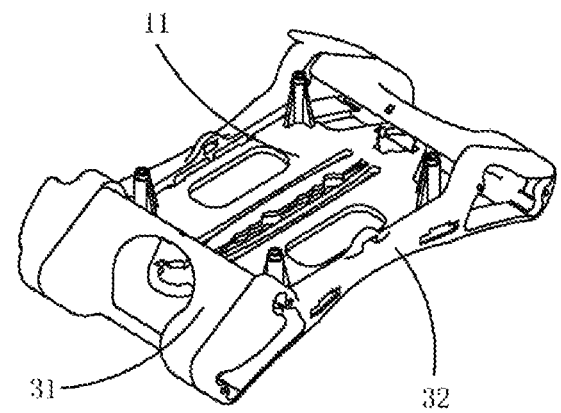
FIG. 3 is a schematic diagram illustrating the connection between the chassis and the shoulder assembly according to the present disclosure.
Figure 4:
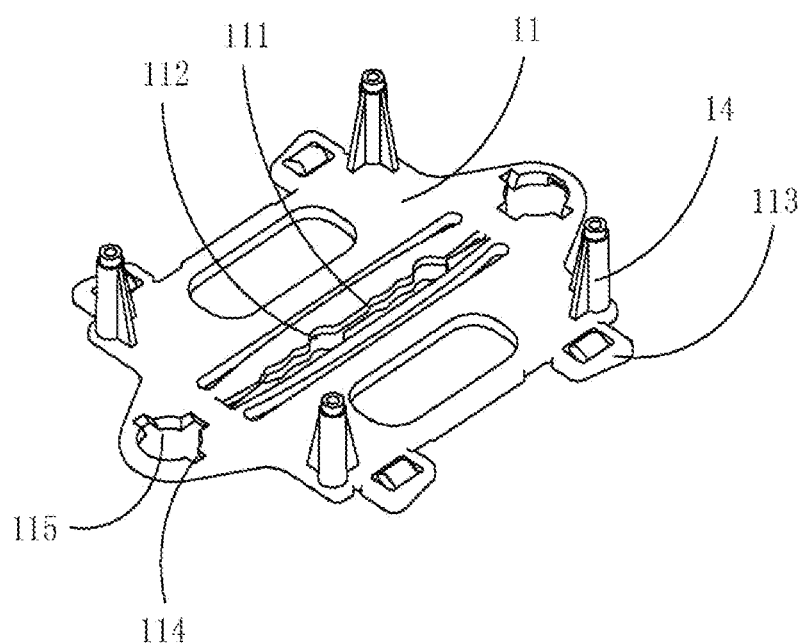
FIG. 4 is a schematic diagram illustrating the structure of the chassis according to the present disclosure.
Figure 5:
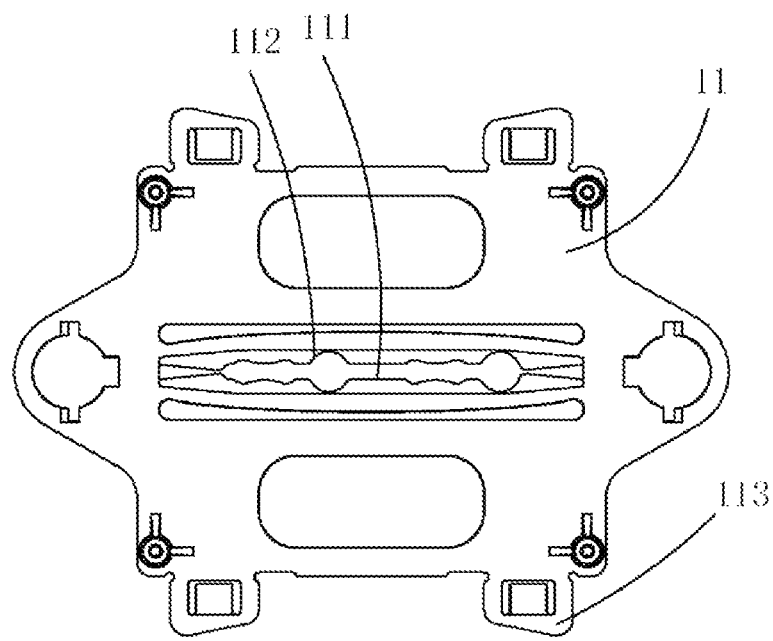
FIG. 5 is a front view of FIG. 4.
Figure 6:
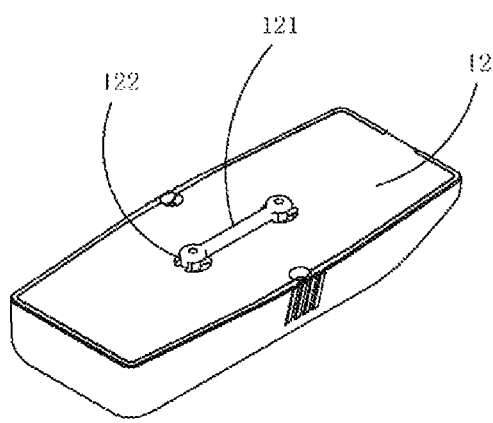
FIG. 6 is a schematic diagram illustrating the battery box according to the present disclosure.
Figure 7:
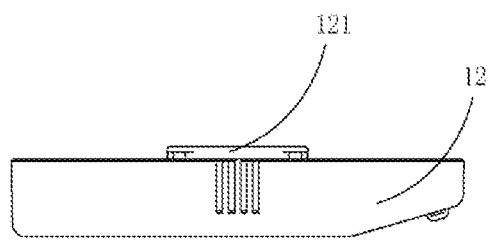
FIG. 7 is a front view of FIG. 6.
Figure 8:
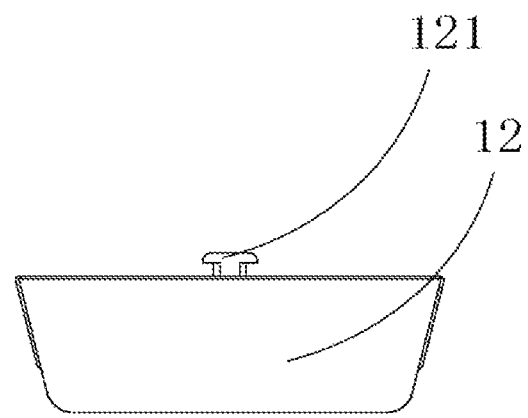
FIG. 8 is a side view of FIG. 6.
Figure 9:
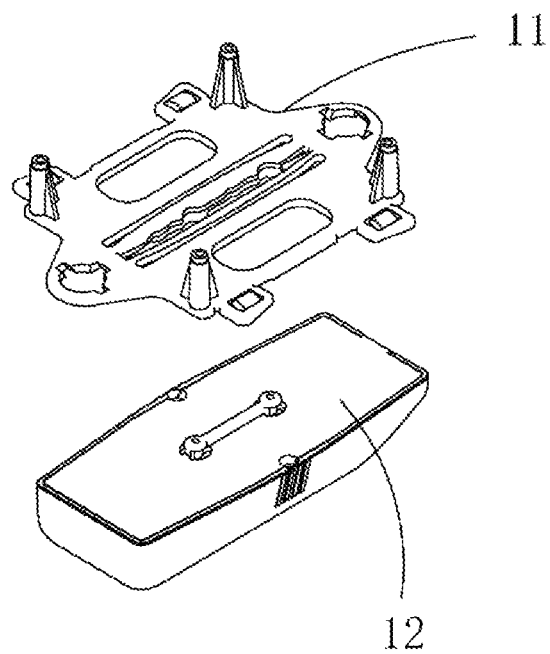
FIG. 9 is an exploded schematic diagram illustrating the connection between the chassis and the battery box according to the present disclosure.
Figure 10:
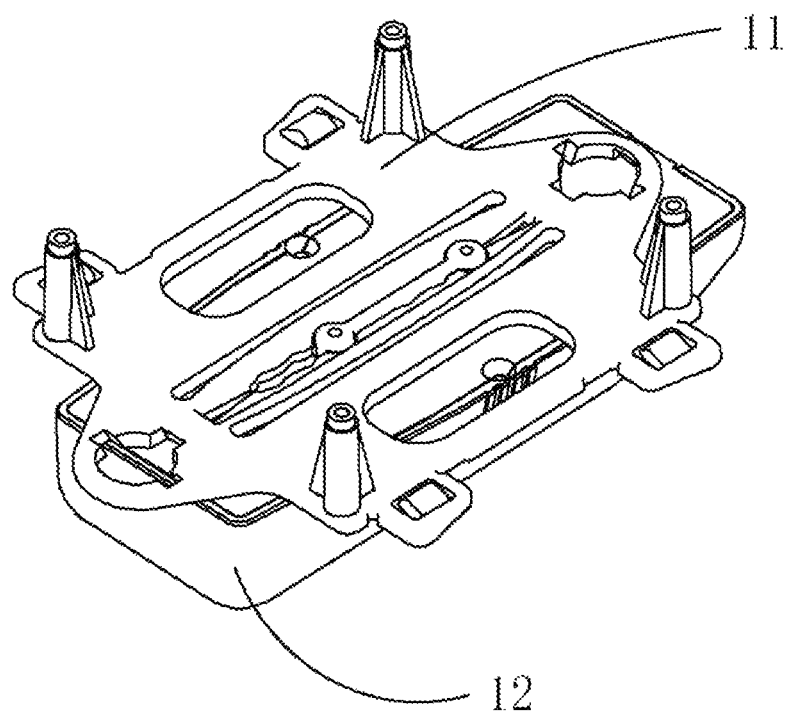
FIG. 10 is a schematic diagram illustrating the connection between the chassis and the battery box according to the present disclosure.
Figure 11:
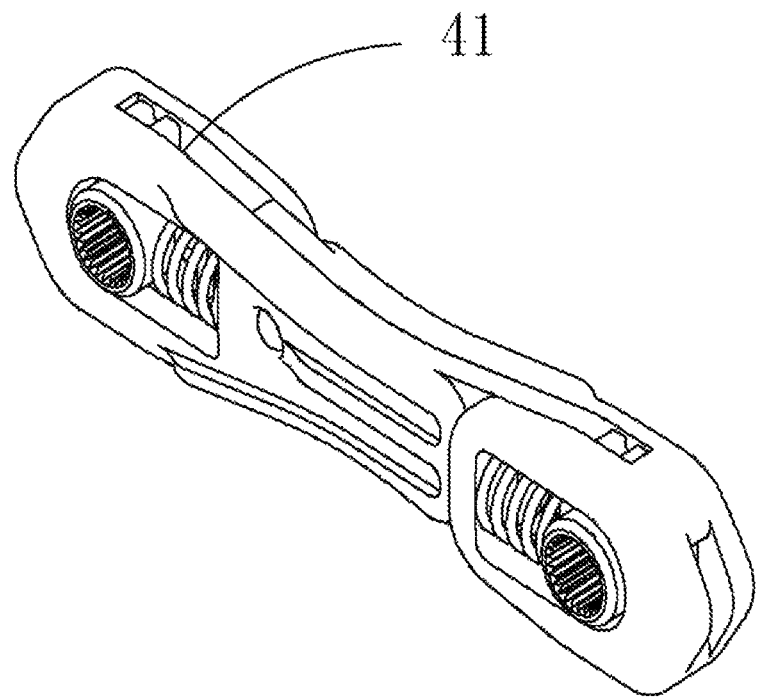
FIG. 11 is a schematic diagram illustrating the upper leg according to the present disclosure.
Figure 12:
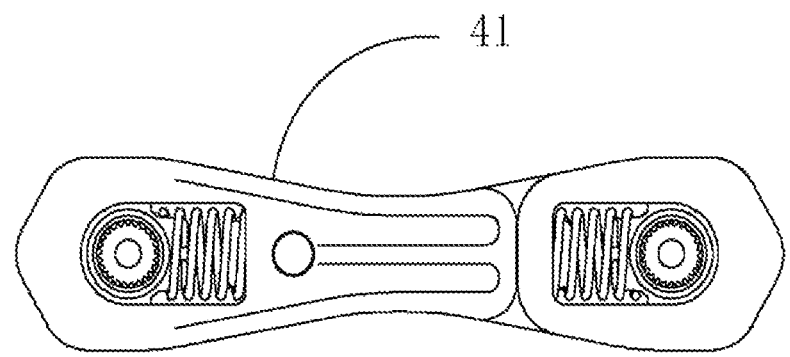
FIG. 12 is a front view of FIG. 11.
Figure 13:
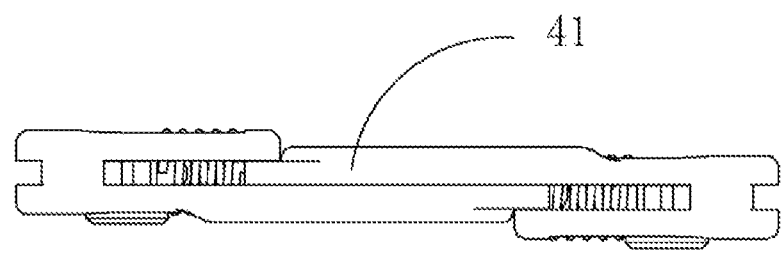
FIG. 13 is a top view of FIG. 11.

As shown in FIGS. 2 to 3, in the present disclosure, the shoulder assembly 3 includes two shoulder plates 31 and two side shoulders 32, where the two shoulder plates 31 are located at the front and rear ends of the base 1, respectively, and the two side shoulders 32 are located on both sides of the base 1, respectively. Both sides of the chassis 11 are each provided with at least one first latch 113, both sides of the shoulder plate 31 are each provided with at least one second latch 311, and the side shoulders 31 are provided with at least one slot 321 for inserting the at least one first latch 113 and at least one socket 322 for the insertion of the at least one second latch 311. Specifically, the robot torso is assembled by the chassis 11, the shoulder plates 31, and the side shoulders 32. Four first latches 113 of the chassis 11 are snapped into the slots 321 of the side shoulders 32 to lock the distance between the two side shoulders. The front and rear shoulder plates 31 support the upper and lower ends of the side shoulders 32 to avoid rolling and shaking. The second latches 311 of the shoulder plates 31 fasten the sockets 322 of the side shoulders 32 to prevent the side shoulder 31 from being tilted forward and backward.

As shown in FIGS. 19 to 24, in the present disclosure, the head assembly 2 includes a head 21 and a neck 22 which are connected to each other. The bottom of the neck 22 is provided with three short tenons 221, and the front end of the chassis 11 is provided with three mortise holes 114 for the insertion of the short tenons 221. The bottom of the neck 22 is further provided with a snap protrusion 222, and the front end of the chassis 11 is further provided with an inner hole 115 for the snap protrusion 222 to be inserted into. The rear end of the neck 22 is provided with a long tenon 223, and the shoulder plate 31 at the front end of the chassis 11 is provided with an elongated groove 312, and the long tenon 223 can be snapped into the elongated groove 312. The top of the neck 22 is connected to the head 21 through a rocker arm 61 of the head servomotor 6. Specifically, there are three short tenons 221 on the bottom surface of the neck 22, which can be obliquely inserted into the three mortise holes 114 in the round hole at the end of the chassis 11. There is another snap protrusion 222 on the bottom surface of the neck 22, which can be snapped fitted with the inner edge of the inner hole 115. There is another long tenon 223 on the back of the neck 22, which can be stuck in the groove 22 on the inner side of the shoulder plate 31. The connecting head of the rocker arm 61 of the head servomotor 6 can be put into the groove in the top surface of the neck 22 and locked by a screw.

Figure 23:
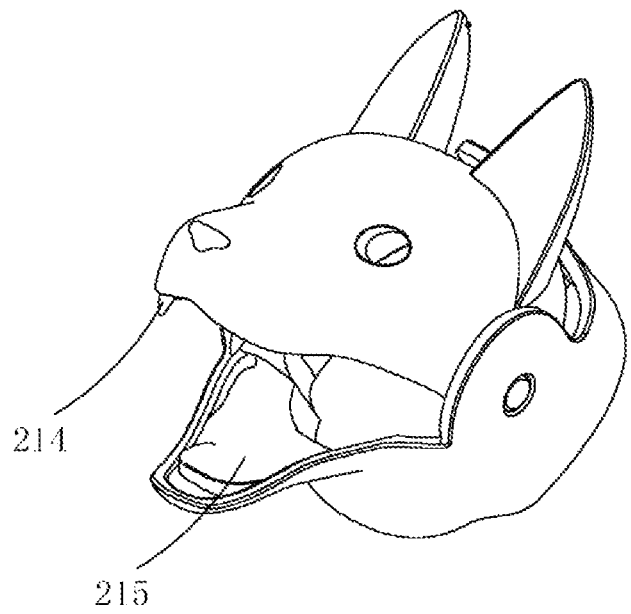
FIG. 23 is a schematic diagram illustrating the head according to the present disclosure.
Figure 24:
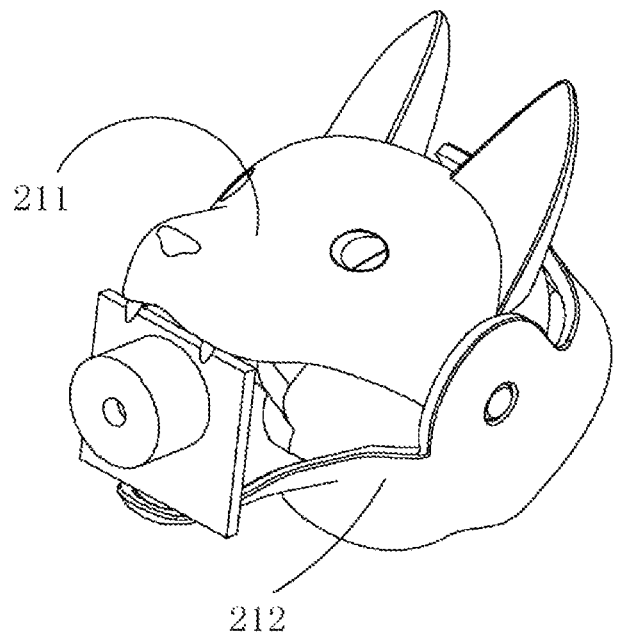
FIG. 24 is a second schematic diagram illustrating the head according to the present disclosure.

As shown in FIGS. 23 to 24, in the present disclosure, the head 21 includes an upper piece 211 and a lower piece 212. The upper piece 211 is hinged with the lower piece 212 through a head rotary shaft 213. The front end of the upper piece 211 is provided with canine teeth 214, and the front end of the lower piece 212 is provided with a dog tongue 215. Specifically, the head is composed of the upper piece 211 and the lower piece 212 connected by the head rotary shaft 213. When the mouth is opened, the back of the upper piece 211 contacts and squeezes the rear elastic piece of the lower piece 212, and so the rear elastic piece deforms and generates an elastic force to bias the mouth to being closed. Specifically, there is a contact point between the rear edge of the upper piece 211 of the head and the lower piece 212. When the upper piece 211 rotates around the head rotary shaft 213, the contact point will move along a circle, and its distance from the surface of the rear elastic piece at the rear of the lower piece 212 becomes smaller and smaller, finally pushing the rear elastic piece. The rear elastic piece generates a restoring force, and the mouth generates a bite force based on the principle of leverage. The canine teeth 214 and tongue 215 at the front of the mouth can hold and stabilize additional accessories, such as decorative props, extended sensor modules, and the like.

Figure 14:
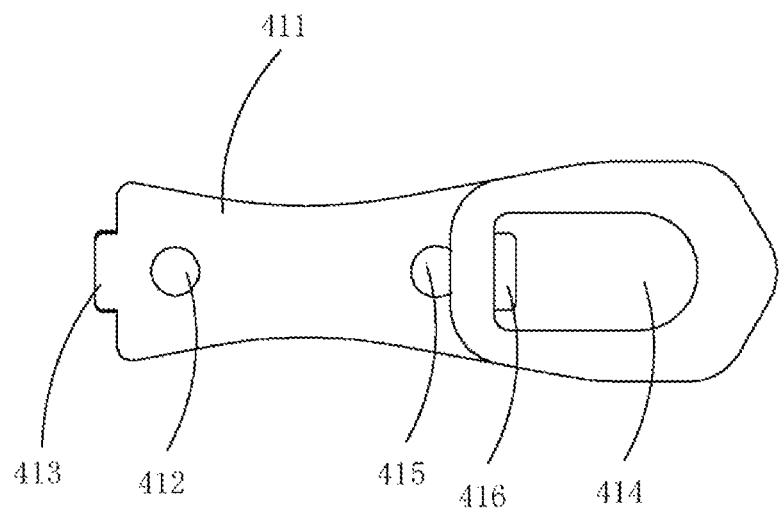
FIG. 14 is a front view of a leg half piece according to the present disclosure.
Figure 15:
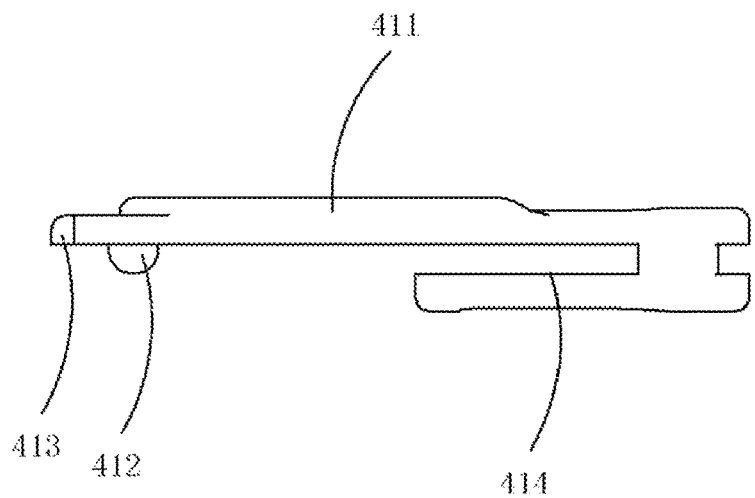
FIG. 15 is a top view of FIG. 14.
Figure 16:
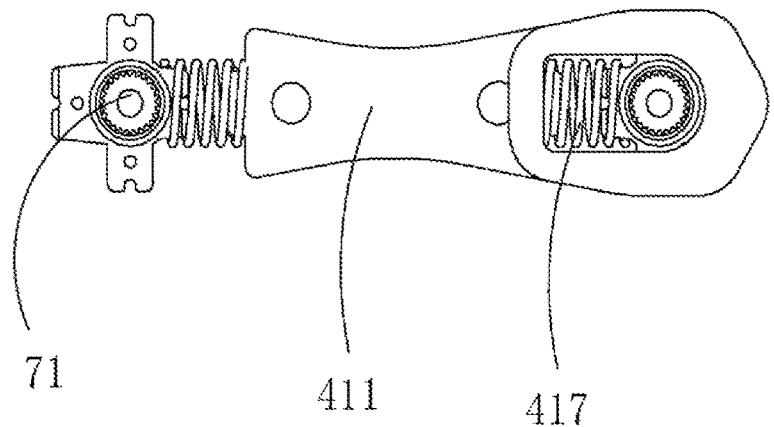
FIG. 16 is a schematic diagram illustrating the connection between the leg half piece and the rocker arm of the shoulder servomotor according to the present disclosure.
Figure 17:
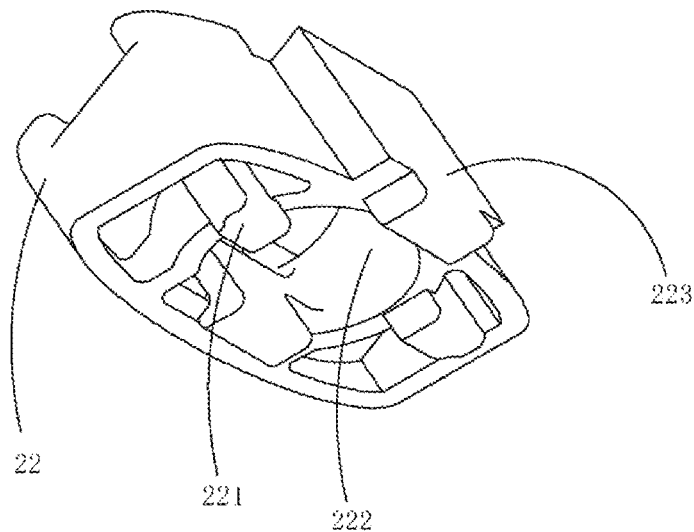
FIG. 17 is a schematic diagram illustrating the neck according to the present disclosure.
Figure 18:
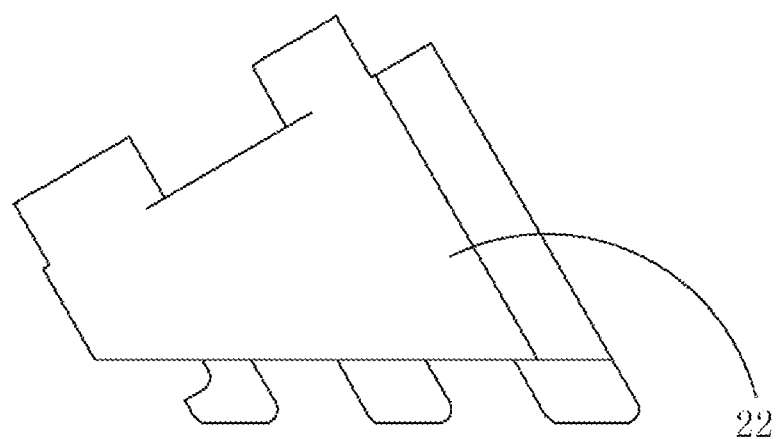
FIG. 18 is a front view of FIG. 17.
Figure 19:
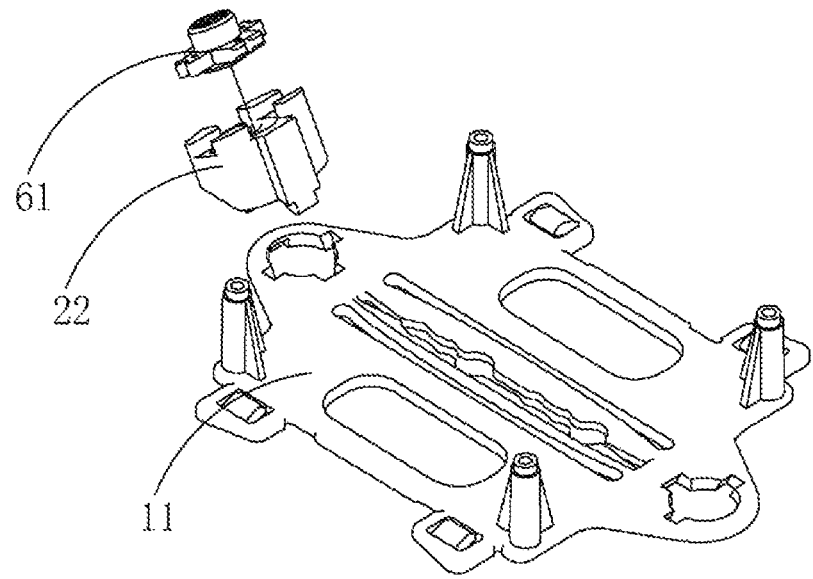
FIG. 19 is an exploded schematic diagram illustrating the connection between the neck and the chassis according to the present disclosure.
Figure 20:
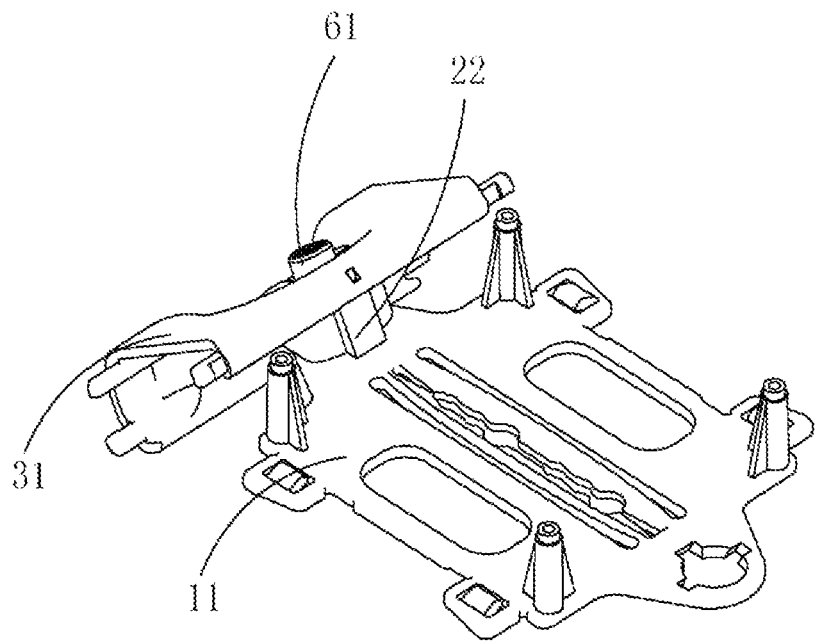
FIG. 20 is a schematic diagram illustrating the connection of the neck, the chassis and the shoulder assembly according to the present disclosure.
Figure 21:
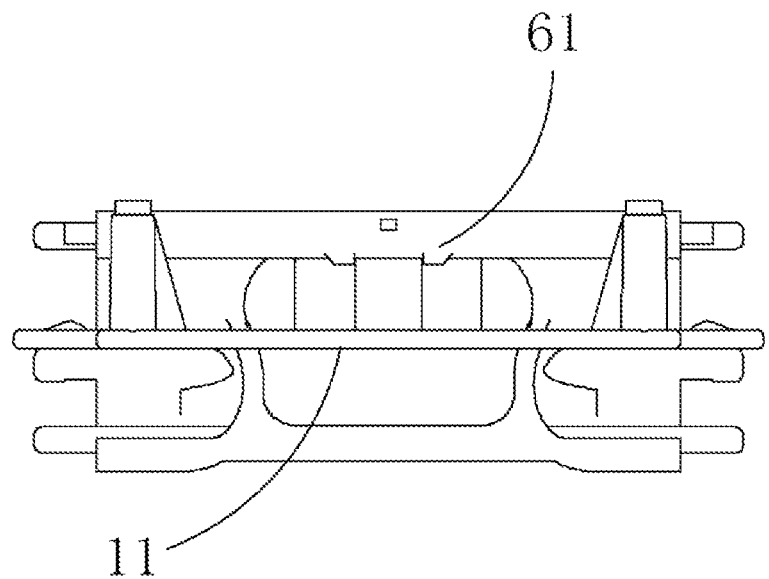
FIG. 21 is a side view of FIG. 20.
Figure 22:
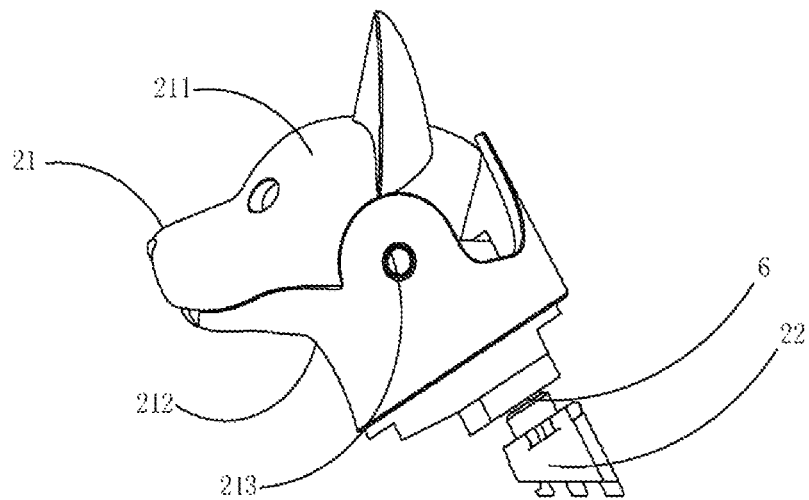
FIG. 22 is a schematic diagram illustrating the head assembly according to the present disclosure.

As shown in FIGS. 14 to 16, in the present disclosure, the leg assembly 4 includes an upper leg 41 and a lower leg 42. The upper leg 41 includes two leg half pieces 411, which are inserted in opposite directions to form the upper leg 41. The front end of the leg half piece 411 is provided with a front insert piece 412, the inner side of the leg half piece 411 is provided with a first convex insert post 413, the rear end of the leg half piece 411 is provided with a hollow slot 414, and the middle of the leg half piece 411 is provided with a front insert slot 415 for inserting the front insert piece 412 and with a second convex insert piece 416 corresponding to the first convex insert post 413. The first convex insert post 413 and the second convex insert post 416 constitute a cylinder, on which the spring 417 is sleeved. The hollow slot 414 at the front end of the upper leg 41 is connected to the shoulder plate 31 through the rocker arm 71 of the shoulder servomotor 7. The hollow slot 414 at the rear end of the upper leg 41 is connected to the lower leg 42 through the rocker arm 81 of the knee servomotor 8, and the end of the lower leg 42 is provided with anti-skid teeth 421.

Figure 25:
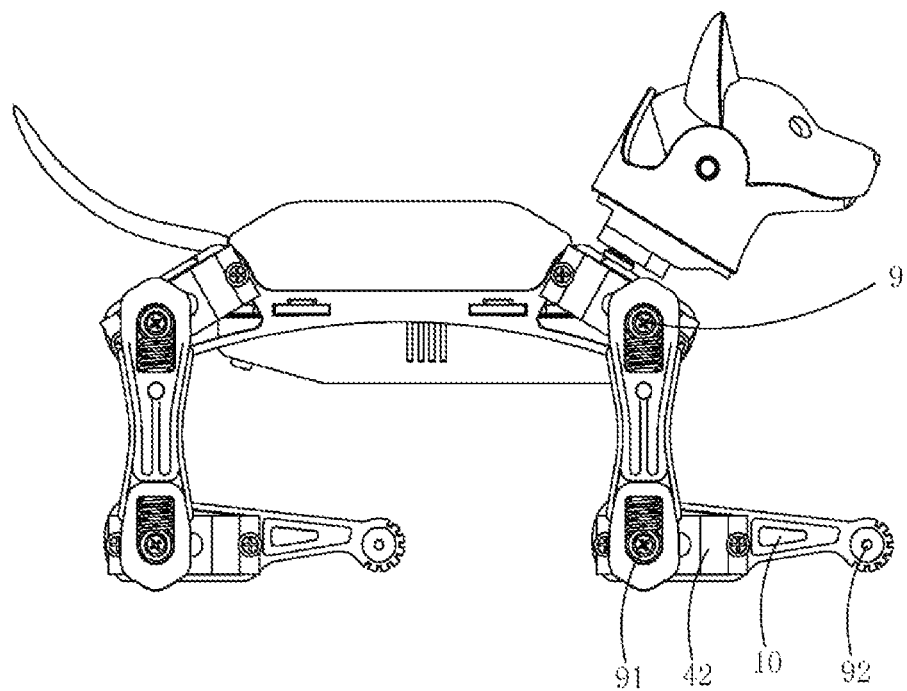
FIG. 25 is a schematic diagram illustrating a first embodiment of a calibration mechanism according to the present disclosure.
Figure 26:
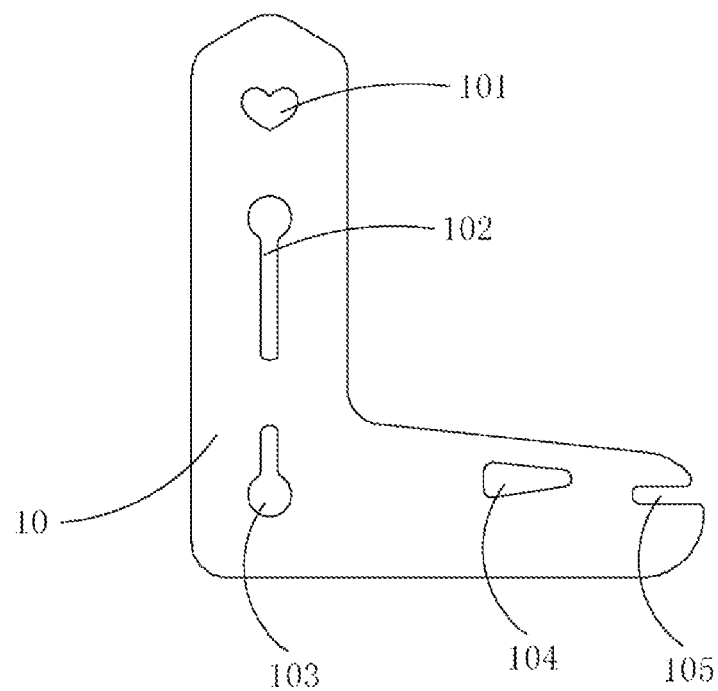
FIG. 26 is a first schematic diagram of a ruler.
Figure 27:
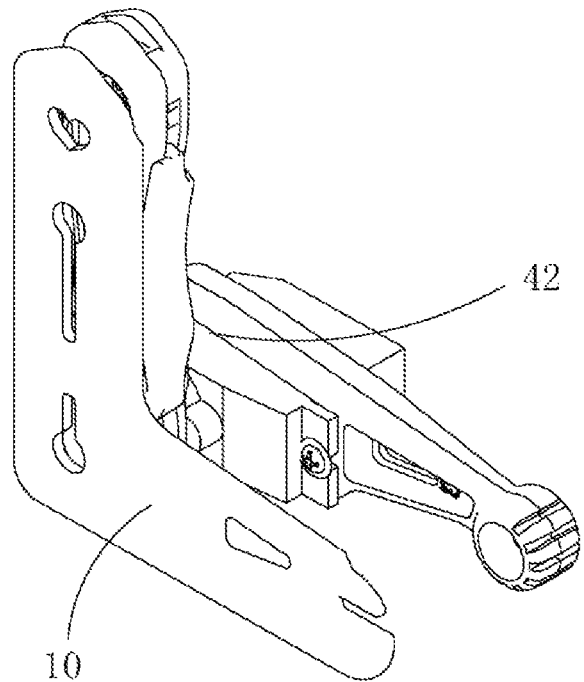
FIG. 27 is a second schematic diagram of the ruler.
Figure 28:
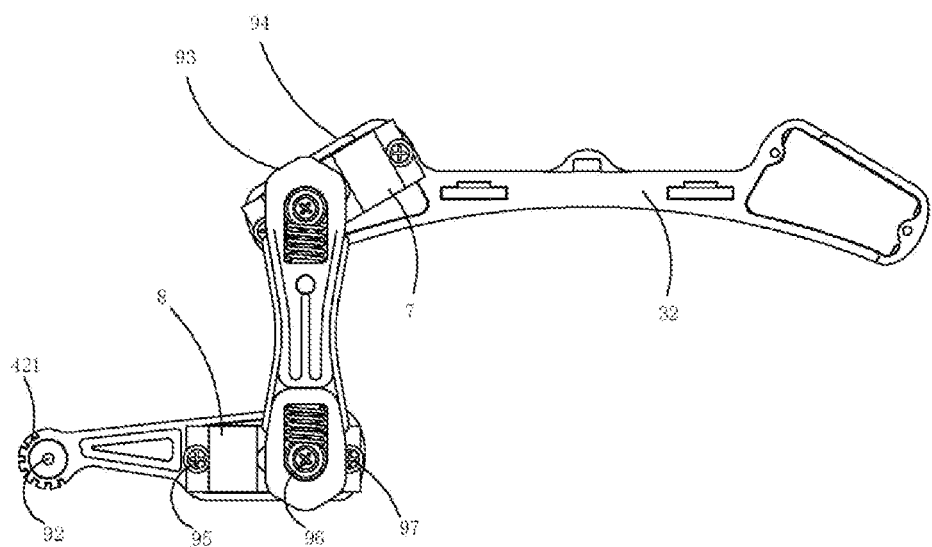
FIG. 28 is a schematic diagram illustrating a second embodiment of the calibration mechanism according to the present disclosure.
Figure 29:
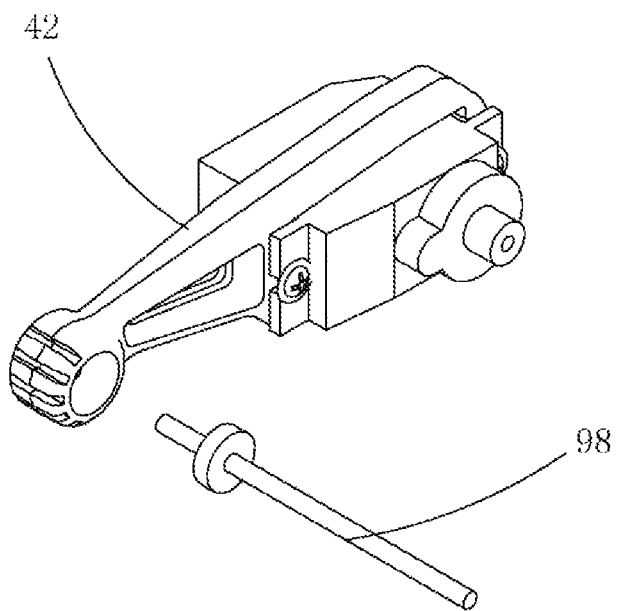
FIG. 29 is a schematic diagram illustrating a round rod inserted into a toe hole according to the present disclosure.
Figure 30:
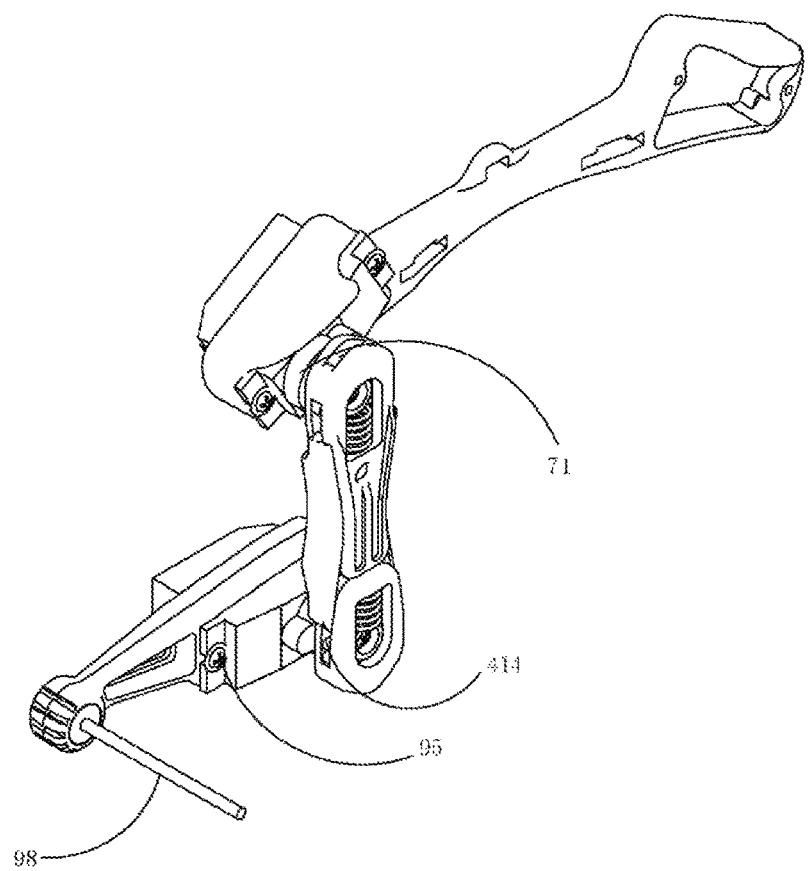
FIG. 30 is a second schematic diagram of a second embodiment of the calibration mechanism according to the present disclosure.
Figure 31:
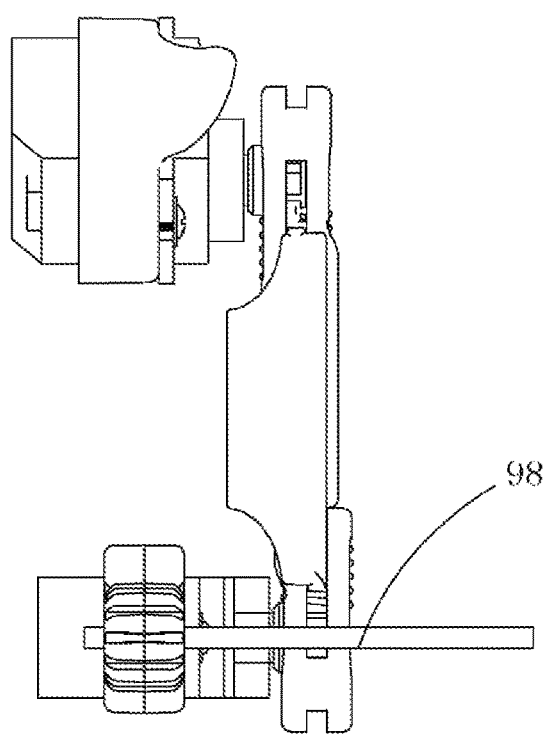
FIG. 31 is a third schematic diagram of a third embodiment of the calibration mechanism according to the present disclosure.

As shown in FIGS. 25 to 27, in the present disclosure, the leg assembly 4 needs to be calibrated to a specific position to accurately perform a target action. The present disclosure provides a first embodiment of the calibration mechanism. The present disclosure uses a special ruler to calibrate the leg assembly 4. The calibration zero position is defined as the position where the upper leg 41 is perpendicular to the chassis 11, and where the lower leg 42 is perpendicular to the upper leg 41. Under the condition that the chassis is horizontal, that is, the connection line from the upper leg joint shaft 9 connecting the upper leg 41 and the side shoulder 32 to the lower leg joint shaft 91 connecting the upper leg 41 and the lower leg 42 is perpendicular to the connecting line between the lower leg joint shaft 91 and the toe hole 92, and where the connection line between the toe hole 92 and the lower leg joint shaft 91 is horizontal. The ruler 10 is L-shaped at a right angle, and has a first circular hole 101 and a second circular hole 103 on the vertical side, the centers of which point to the center of the lower leg joint shaft 91. Below the first circular hole 101 are a circular and elongated long hole 102, whose boundaries are aligned with the texture on the upper leg 41, as an auxiliary reference. There is a triangular hole 104 on the horizontal side of the ruler 10, the boundaries of which are aligned with the triangular hole 104 on the lower leg 42. There is a long slot 105 at the end of the ruler 10, and its central axis passes through the toe hole 92. When the viewing angle is moved, the toe hole 92 can be observed to move in the long slot 105. If the angle between the upper leg 41 and the horizontal plane is not perpendicular, the first round hole 101 and the second round hole 103 will form an angle with the texture on the upper leg. If the lower leg is not level, the ruler 10 and the triangular hole 104 in the lower leg 42 will also form an angle. By entering the correction amount into the software, the joint can be rotated to achieve the above-mentioned alignment. With the help of a parallel or collinear reference system, the calibration error caused by the change of the viewing angle can be avoided.

As shown in FIG. 28 to FIG. 31, apart from using the aforementioned tool as the calibrator, the present disclosure provides the second embodiment of the calibration mechanism, where reference marks are introduced to the robot body, so that joint calibration can be performed without the need for special tools. There is an oblique side 93 at the end of the upper leg 41, and the oblique side 93 should be parallel to the oblique side 94 of the side shoulder when the shoulder assembly 3 is at the zero position. By changing the viewing angle, it can be observed that the two oblique sides are collinear, and that the anti-skid teeth 421 at the end of the lower leg 42, the round hole 92 in the toe, the first mounting screw 95, the second mounting screw 96, and the third mounting screw 97 of the knee servomotor are collinear, and furthermore they will be collinear with the hollow slot 414 of the upper leg 41 at the zero position, which can be observed from the front of the robot by inserting the round rod 98 into the toe hole 92. It is only needed to make sure that the round rod 77, the mounting screw 95 of the knee servomotor, and the hollow slot 414 are collinear in order to ensure that the knee joint reaches the calibration zero position. The foregoing merely illustrates some illustrative embodiments according to the present disclosure and is not intended to limit the present disclosure. Any modifications, equivalent replacements and improvements made within the spirit and principles of the present disclosure shall fall in the scope of protection of the present disclosure.

What is claimed is:

1. A quadruped robotic dog equipped with a center of gravity adjustment mechanism, comprising:
   a base, comprising a chassis and a battery box;
   a shoulder assembly, connected to the base;
   a head assembly, connected to a top of the shoulder assembly; and
   a leg assembly, connected to sides of the shoulder assembly;
   wherein the chassis comprises an elastic slide rail, which defines at least two cap holes; wherein the battery box comprises a slide bar, both ends of which each comprise a round cap; wherein the round caps of the battery box are operative to be snapped-fitted with the at least two cap holes, and the slide bar of the battery box is operative to slide within the elastic slide rail, allowing the battery box to slide back and forth along the elastic slide rail.

2. The quadruped robotic dog of claim 1, wherein the shoulder assembly comprises two shoulder plates and two side shoulders, wherein the two shoulder plates are respectively disposed at a front and a rear end of the base, and wherein the two side shoulders are respectively disposed on both sides of the base;
   wherein both sides of the chassis each comprise at least one first latch, both sides of each shoulder plate each comprise at least one second latch, and wherein the two side shoulders each comprise at least one slot for inserting the at least one first latch and at least one socket for inserting the at least one second latch.

3. The quadruped robotic dog of claim 2, wherein the chassis comprises at least one mounting post for fixing a circuit board; wherein the base further comprises an upper cover, which is connected to the shoulder assembly through raised snap rings disposed on the two side shoulders to cover the circuit board.

4. The quadruped robotic dog of claim 3, wherein the head assembly comprises a head and a neck that are connected to each other, wherein a bottom of the neck comprises three first tenons, a front end of the chassis comprises three mortise holes for inserting the three first tenons.

5. The quadruped robotic dog of claim 4, wherein the bottom of the neck further comprises a snap protrusion, and the front end of the chassis further comprises an inner hole for inserting the snap protrusion.

6. The quadruped robotic dog of claim 5, wherein a rear end of the neck comprises a second tenon that has a greater length than each of the first tenons, and the shoulder plate at the front end of the chassis comprises an elongated groove, and the long tenon is operative to be snapped-fitted into the elongated groove; wherein a top end of the neck is connected with the head through a rocker arm of a head servomotor.

7. The quadruped robotic dog of claim 6, wherein the leg assembly comprises an upper leg and a lower leg that are pivotally connected to each other, wherein the upper leg comprises two leg half-pieces, wherein the two leg half-pieces are inserted in opposite directions to constitute the upper leg;
   wherein a front end of each leg half piece comprises a front insert piece, an inner side of the leg half piece comprises a first convex insert post, a rear end of the leg half piece comprises a hollow slot, a middle portion of the leg half piece comprises a front insert slot for inserting the front insert piece and further comprises a second convex insert post corresponding to the first convex insert post, wherein the first convex insert post and the second convex insert post constitute a cylinder, and a spring is sleeved on the cylinder.

8. The quadruped robotic dog of claim 7, wherein a hollow groove at the front end of the upper leg is connected to the shoulder plate through a rocker arm of a shoulder servomotor; the hollow slot at the rear end of the upper leg is connected with the lower leg through a rocker arm of a knee servomotor.

9. The quadruped robotic dog of claim 8, wherein an end of the lower leg comprises anti-slip teeth.

10. The quadruped robotic dog of claim 9, wherein the head comprises an upper piece and a lower piece, wherein the upper piece is hinged with the lower piece through a head rotary shaft, a front end of the upper piece comprises canine teeth, a front end of the lower piece comprises a dog tongue; wherein a rear edge of the upper piece is in contact with the lower piece, and when the upper piece rotates around the head rotary shaft, the contact point moves along a circle.

* * * * *